May 1, 1934.  E. OEHMICHEN  1,957,148
DEVICE FOR REDUCING THE STRESSES UPON FILMS IN CINEMATOGRAPHIC APPARATUS
Filed Oct. 3, 1927  4 Sheets-Sheet 1
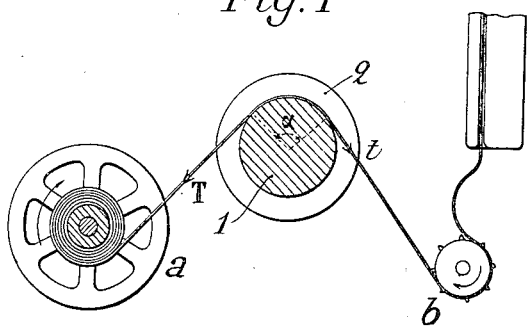
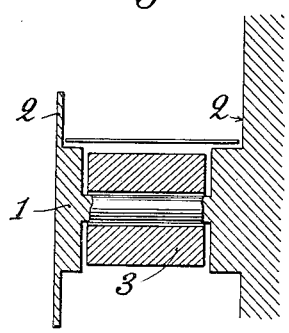
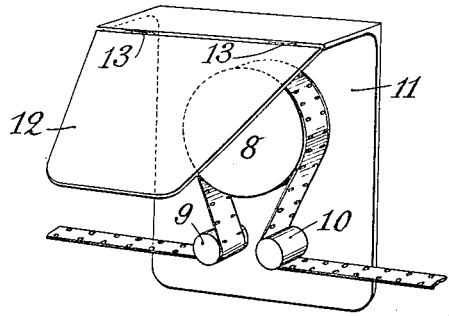
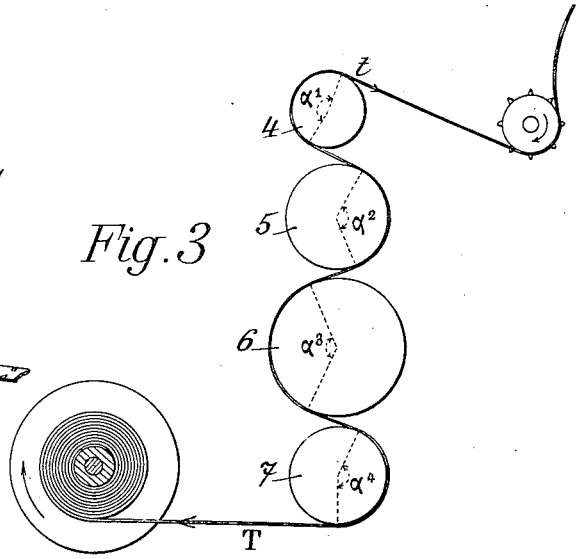
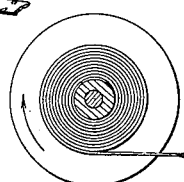
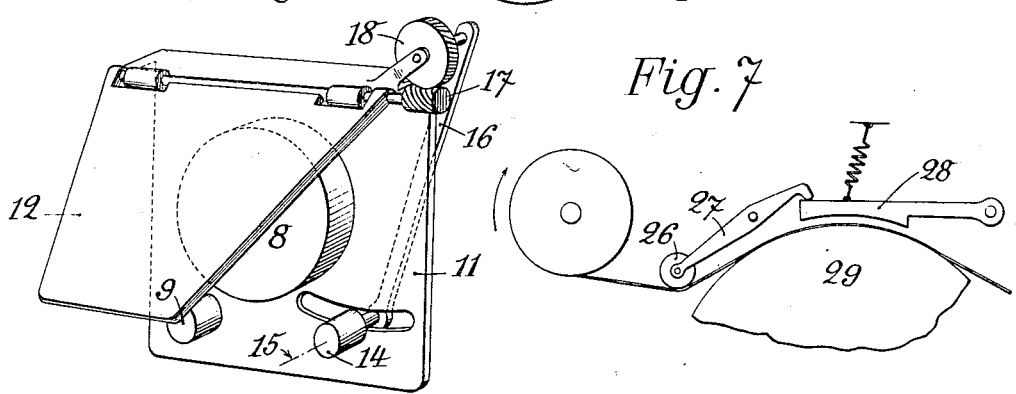
E. Oehmichen
INVENTOR
By: Marks & Clerk
ATYS.

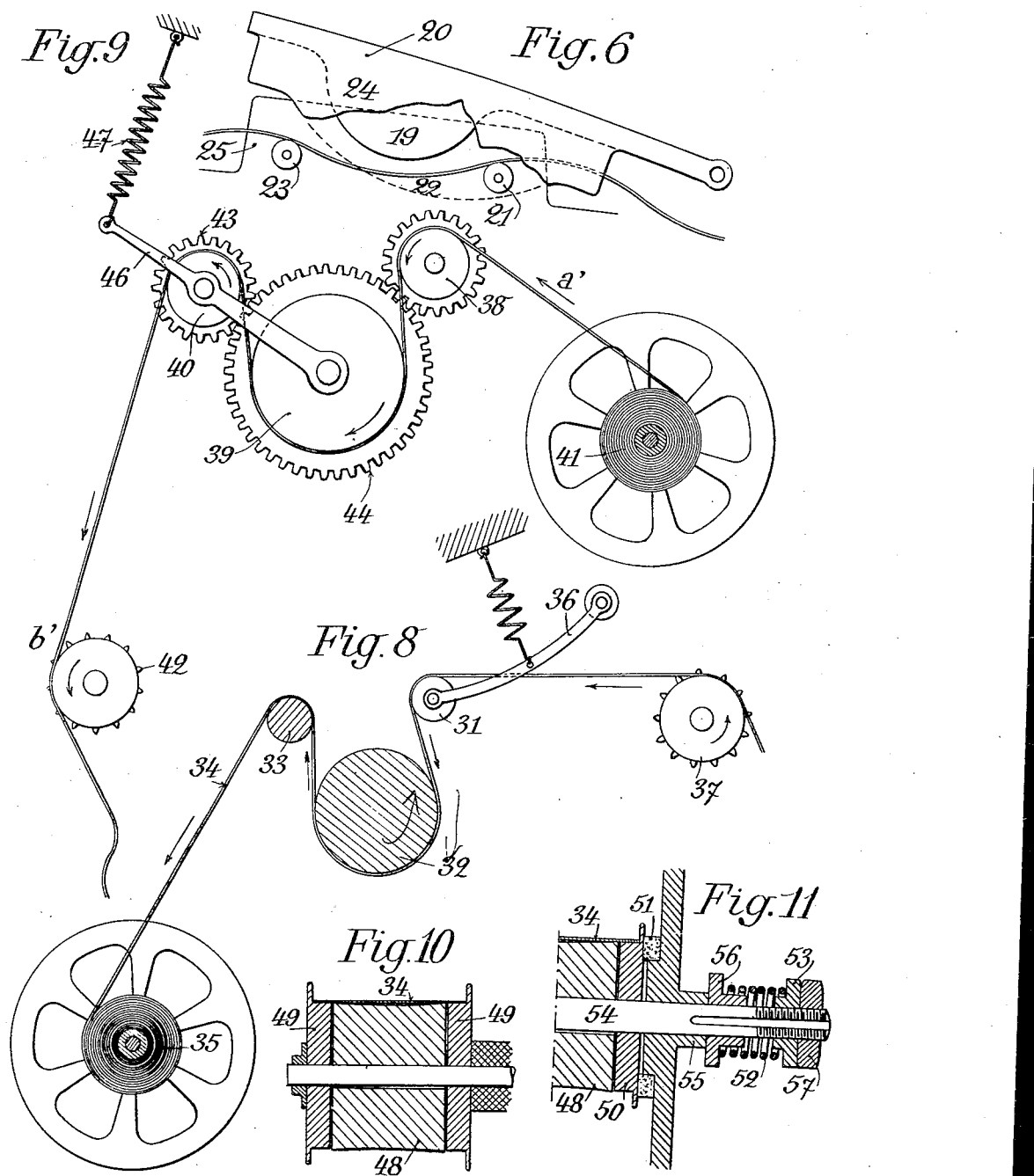

May 1, 1934.  E. OEHMICHEN  1,957,148
DEVICE FOR REDUCING THE STRESSES UPON FILMS IN CINEMATOGRAPHIC APPARATUS
Filed Oct. 3, 1927  4 Sheets-Sheet 3

E. Oehmichen
INVENTOR

By Marks & Clerk
Attys.

May 1, 1934.　　　　　E. OEHMICHEN　　　　　1,957,148
DEVICE FOR REDUCING THE STRESSES UPON FILMS IN CINEMATOGRAPHIC APPARATUS
Filed Oct. 3, 1927　　　　4 Sheets-Sheet 4
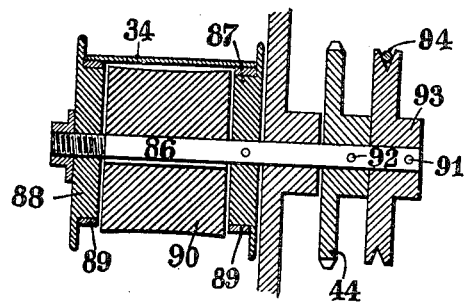

Patented May 1, 1934

1,957,148

UNITED STATES PATENT OFFICE

1,957,148

DEVICE FOR REDUCING THE STRESSES UPON FILMS IN CINEMATOGRAPHIC APPARATUS

Etienne Oehmichen, Valentigney, France

Application October 3, 1927, Serial No. 223,822
In France January 15, 1927

8 Claims. (Cl. 271—2.3)

The present invention relates to cinematographic apparatus in which the films proceed from an unwinding reel and travel through the gate of the apparatus in which it is given an intermittent motion by suitable mechanism, and is then wound upon the winding reel which rotates at a variable speed, in virtue of the gradual increase in the diameter of the wound portion of the film. The drive for this variable speed is usually effected through the medium of a friction coupling which is placed between the said winding reel and a driving element which rotates at a sufficient uniform speed.

Such apparatus are usually provided at each end of the gate with toothed drums or feeding sprockets in continuous rotation which engage the film perforations; the film thus forms loose strands between the gate and the respective rollers, so as not to interfere with the action of the intermittent film-drawing mechanism. In any event, the film may be subjected to variations in the driving couple or to variations in the effects of friction, inertia or the like, and these will often cause excessive tension between the winding or the unwinding reels and the tooth or claw devices by which the film is actuated, whereby the film may be torn or broken, and chiefly in its perforated portion.

The present invention has for its object to automatically reduce all such tension and hence to diminish the stresses and the wear of the film.

For this purpose, the film when traveling between the gate and the respective reels is disposed upon one or more guiding elements, which are so arranged that the film will be pressed against them with a force depending upon the tension; the surface of said elements has a certain motion, relatively to the film, in the direction of the gate, so that if the tension on the film increases, the friction on said surfaces will at once tend to slacken the part of the film situated between said surface and the gate, thus obviating all excessive effort between the perforated parts of the film and the teeth or claws of the driving device.

As concerns the part of the film below the gate, the guiding surfaces must be given, with reference to the film, a relative motion in the direction of the aforesaid toothed drum, i. e. contrary to the absolute motion of the film, and hence the absolute speed of the said surfaces must be less than the (mean) speed of the film, and said surfaces may even be made stationary. For the portion of the film above the gate, the absolute speed of the friction surfaces must be greater than the mean speed of the film.

In the first case, a momentary tension will cause a braking action on the film due to the guiding surfaces whose motion is slow or null, whereas the feeding mechanism continues to draw forward the film and thus causes a slackening of the portion of the film which was about to exercise an excessive traction upon the teeth or claws of said mechanism; in the second case, a momentary tension will cause the film to adhere to the guiding surfaces whose speed is greater than the mean speed of the film, and hence these surfaces will draw forward an excess of film, and the film will thus be at once slackened in its portion drawn forward by the feeding mechanism.

The resulting effect, as concerns the reduction of the stresses upon the film, will be the same in both cases.

Fig. 1 is a diagrammatic view showing a guiding element placed between the gate and the winding reel.

Fig. 2 is an axial section of a fixed guide roller with loose middle ring.

Fig. 3 is a diagrammatic view of a device comprising several successive guiding elements.

Fig. 4 is a perspective view of a set of several guide rollers combined with a hinged door.

Fig. 5 is a like device in which one roller is movable in cooperation with the door.

Fig. 6 is an elevational view of a device in which a guiding element is mounted upon a lever.

Fig. 7 shows a construction comprising a brake for pressing the film on a guiding surface.

Fig. 8 shows another construction comprising a movable roller pressed in an elastic manner against the film.

Fig. 9 shows the use of positively rotated guiding elements placed between the unwinding reel and a toothed feeding reel.

Figs. 10 and 11 are axial sections of a guide roller which is stationary as in Fig. 10 or is held by friction as in Fig. 11, and is provided with a loose middle ring.

Fig. 15 is a vertical section showing a drum divided into several parts and toothed wheels used for driving the same.

Figure 14:
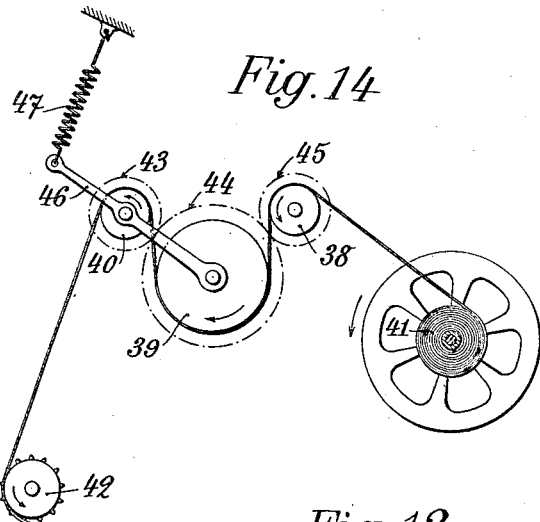
Fig. 14 is a general diagrammatic view of a cinematographic apparatus comprising a certain number of the devices shown separately in the preceding views.

Fig. 1 shows an arrangement according to the invention, in which the guiding device placed between the winding reel $a$ and the second toothed drum $b$ consists of a stationary drum 1 made of a substance having a large coefficient of friction relatively to the film; this latter is suitably guided by the lateral cheeks 2 and travels upon the drum 1 which is preferably cut out at the central part upon a width which equals the width of the film views, as shown in Fig. 2 which is a section on the axis of the cylinder.

The said device offers no opposition to the travel of the film, for as long as this is fed from the drum $b$, no effort will oppose its free passage; but the device entirely prevents a traction which is greater than $t$, from being transmitted from the winding drum to the part of the film issuing from the gate. The same result will be obtained if the drum 1 is not stationary but turns in the contrary direction to the travel of the film, or even in the same direction but at a smaller peripheral speed than the mean speed of the film, and thus in all cases the relative motion of its surface of friction with reference to the film will be directed towards the feeding drum, i. e. towards the gate.

If the guiding means consist of cut-out drums, I prefer to place in the space thus formed a loose ring 3 (Fig. 2) which is adapted to roll upon the shaft or hub of the cylinder, and whose outer diameter is somewhat smaller than the friction diameter of the said drum.

The said ring is employed with very thin films, and will prevent all scraping out of the film between the friction parts of the stationary cylinder, due to the motion of the ring on its axis, without applying the braking effort upon the images, and allowing the friction effect to take place solely upon the lateral parts of the film.

I may increase the number of guiding parts, as shown in Fig. 3, so as to increase in a practically indefinite manner the difference between the values T and $t$. In this figure, 4—5—6—7 are four stationary parts, for instance drums, disposed like the drum 1 of Fig. 1, and the film travels thereon. $\alpha_1$—$\alpha_2$—$\alpha_3$—$\alpha_4$ are the winding angles of the film on the drums. It is observed that the ratio between the extreme tensions T and $t$ increases very rapidly with the value of the said angles, and it is not necessary to employ a great number of surfaces in order to obtain a great reduction ratio between the efforts T and $t$.

A convenient device according to the invention is shown in Fig. 4; 8 is a drum of rather large diameter, 9 and 10 are two drums of smaller diameter, and all the drums are mounted in the fixed position on a cheek 11. A door 12 which may be hinged at 13 or otherwise mounted may be opened at will to entirely uncover the drums 8—9—10 when the film is to be placed upon them, or it may be closed so as to guide the film between the door and the cheek 11 upon which the drums are mounted.

This arrangement of the drums affords a large winding arc and the device is most efficient. The friction on the large drum may suffice, thus dispensing with the use of the friction on the small drums, and these may be made loose on their shafts and serve solely as guides obliging the film to wind upon a considerable arc of the stationary drum 8.

This dispostion is advantageous from the fact that the film is subject to friction only upon one face.

If it is desired to further facilitate the insertion of the film, the two small cylinders, or only one of them, can be made movable (Fig. 5) so that it may be moved aside for the insertion of the film and then returned for use.

Fig. 5 which is self-explanatory, shows such a movement which takes place with one drum 14, which may be loose on its axle 15. The second small drum 9 is stationary and cannot turn on its axle. When the guiding door 12 is opened and closed, this displaces the movable drum 14 whose axle slides in a slot in the cheek 11 in any suitable manner; herein the arm 16 carrying the movable drum is connected with the said door by worm gearing 17—18; the direction of travel is such that the winding angle is increased when the door is closed and is reduced when open. By these operations the film can be more readily inserted.

Fig. 6 shows a device in which the friction guide 19 is mounted on a pivoted lever 20—which may consist of an extension of the guide-holder of the cinematographic apparatus itself—and it obliges the film, when the device is closed, to follow the path 21—22—23; 21 and 23 are fixed or movable drums or rollers; 24 and 25 are cheeks (24 is partly broken away in Fig. 6) which for greater convenience may pertain respectively to the lever 20 and to a plate carrying the braking rollers 21—23, or may consist of this plate itself.

The arc of contact may be reduced by increasing the pressure of the film upon the friction surface in any suitable manner. Fig. 7 shows such an arrangement in which one of the movable drums 26, next the winding reel, controls by the pivoting of the lever 27 on which is rotatably mounted the motion of a shoe 28 in contact with the whole or a part of the arc of friction of the film upon the fixed guide 29. Should the film tension become excessive, the film is at once pressed upon the fixed surface and the tension of the winding reel will be no longer transmitted beyond the said surface. In this particular case, the friction surface may be much reduced and may even become rectilinear. In all cases I avoid bringing the friction surface upon the film except on the perforated side parts whereby no friction will take place on the image portion.

The winding device shown in Fig. 8 comprises not only the parts 31—32—33 upon which the film travels before proceeding to the winding reel 35, but also an elastic damping device which consists of the element 31, of roller shape, which is mounted on an arm 36 movable in one direction under the control of a spring or weight and adapted to yield in the other direction when the tension of the film increases; said roller is placed between the reel 35 and the output feeding device 37. It affords a regular motion for the said reel, and obviates all shocks due to a momentary excess of tension.

The guiding means provided between the gate and the winding reel are equally applicable to the part of the film comprised between the unwinding reel and the gate. I may use (Fig. 9) the rollers 38—39—40 which are rotatable on their axles and are controlled by adequate mechanism, coacting with the cinematographic mechanism, and are rotated so that they will have the same peripheral speed, this exceeding the mean rate of travel of the film in the gate.

The film to be projected on the screen, or to be printed, is supplied from the reel 41; it travels on the said rollers, on the path $a^1$ $b^1$ as shown. Should the film feed be excessive, the contact between the film and rollers will cease at once, but if the feed falls short, the contact again takes place between the film and the rollers, each roller acts after the manner of a capstan and tends to draw the film forward relatively to the reel 41, this action being very strong at $a^1$ for a very small value of the tension at $b^1$ where the dangerous points are located, since the film is drawn at these points by the teeth of the drum 42 coacting with the perforations.

The output roller 40 may be placed as in Fig. 9, and herein the three rollers are secured to respective pinions 43—44—45 whose pitch diameters have the same ratio as the roller diameters; the roller 40 is mounted on a lever 46 pivoted on the axle of the roller 39, and thus the pinion 43 may roll upon the pinion 44 and the roller 40 may be separated from the roller 38 against the action of the spring 47, or a weight on the lever 46.

Due to the abnormal tension caused by the feeding element 42, the film may yield, thus actuating the roller 40 and obliging the pinion 43 to roll upon the pinion 44. If the parts are properly disposed, this motion of the roller will give it a greater tangential speed than that of the film, so that the film will be at once applied against the other rollers, and the general travel of the film will take place without excessive tension, due to the adhesion between the film and the contact surfaces.

The mechanism controlling the said rollers or drums may be of any suitable construction; as also the number and the arrangement of the said rollers, on condition that in case the film should be subjected to tension in the parts such as $b^1$, the film will be obliged to make contact at i's perforated edges with one or more movable surfaces which will draw it forward by adhesion, thus providing a sufficient feed to reduce the excessive tension to the normal value as determined.

Fig. 10 relates to the cut-out form of the middle part of the friction surfaces. As stated, I dispose upon each cut-out roller or drum a loose roller of smaller diameter (Fig. 2) in such manner that the perforated edges of the film will alone make contact with the cheeks of the said drum, and that its middle part will not be subjected to friction and will not be hollowed out to any extent.

As shown in Fig. 10, the loose roller 48 is given a curved outline whose deflection is small and whose ends make light contact with the cheeks 49 of the roller; herein the parts of the film between the perforations and the images will be supported, without breaking, both by the edges of the cheeks 49 and by the edges of the roller 48 which form almost continuous surfaces, thus obviating the stresses which would occur if the film should travel upon sharp edges. The roller 48 may have the form of a hyperboloid of revolution.

On Fig. 15, 86 denotes the axis of a rotary friction element represented at 39 for instance (Fig. 14). 87 and 88 are two cheeks connected to the axis 86. Between the cheeks 87 and 88 is disposed a ring 90 which is slightly recessed on its external part and which is capable of rotating freely upon the axis 86.

A toothed wheel 44 is connected to the axis 86, by means of a pin 92 for example. The movement transmitted to the axis 86 in any suitable manner by the mechanism of the cinematographic apparatus allows the cheeks 87 and 88 to rotate at a well determined speed so that the tangential speed of the said cheeks relatively to the film 34 will be constantly directed towards the gate of projection, according to the principle of the invention.

By way of example, a pulley 93 connected to the axis 86 by means of a pin 91 is driven by a belt 94 which is, in its turn, driven by a pulley 95 connected to the axis of the feeding drum 42 (Fig. 14); the said pulley 93 being slightly smaller than the pulley 95.

When varnished films are used, the varnish might be deposited in the course of time upon the stationary friction surfaces whereby an excessive friction would take place; it is therefore advisable to give the friction surfaces only a relatively fixed position, and I may mount them on their supports only by friction, or by suitable means, so that they will yield under an effort in excess of a stated value. Fig. 11 shows a roller 50 analogous to the roller 49 of Fig. 10, but this is not absolutely fixed, and it is held by the friction of one side against a fixed friction ring 51, the pressure being produced by a spring 52 whose pressure can be adjusted by the nut 53. The cheeks of the roller are secured to the axle 54 which is mounted with free motion in a socket 55 secured to the main frame, and the spring is compressed between the nut 53 and a disk 56 which is slidably keyed to the axle 54. 57 is a lock nut for the nut 53. I may obviously use any other suitable means whereby the roller— or like friction surface—will be held as long as the effort due to the adhesion of the film is below a stated value.

In the preceding construction, the tension, by reason of the elasticity of the film, will not be established in an absolutely instantaneous manner, and when the film is braked, a very small slip may occur between the film and the friction surfaces, by which the film may be scratched. For this reason the film only makes contact with the friction surfaces by its perforated edges, and these may be scratched or streaked without inconvenience to the screen projection, and the middle part of the friction drum is cut out, or I may even provide this part with a loose roller, to prevent all damage to the image part of the film.

Figure 12:
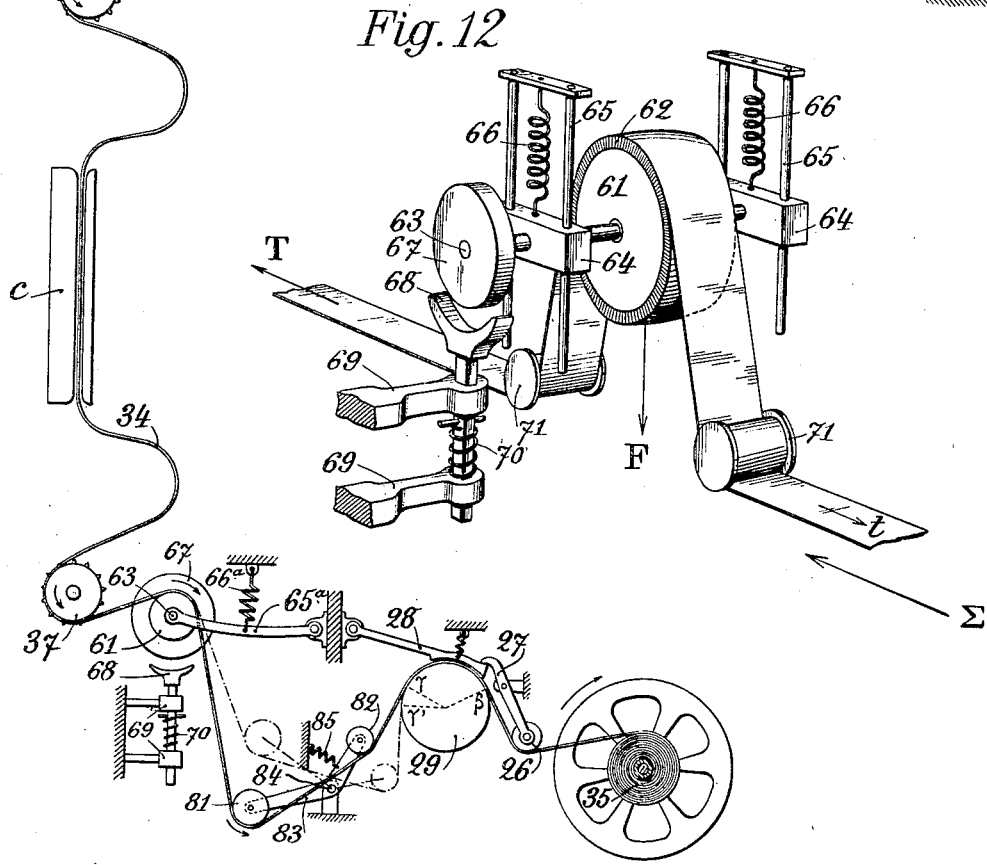
Fig. 12 is a perspective view of a device comprising a guide roller in friction contact with a brake shoe, and not with the film itself.

I am however enabled to obtain practically the same advantages as enumerated, and also to prevent all slipping of the film in a radical manner. An arrangement for this purpose is shown in Fig. 12, and I thus allow the film to make contact upon the whole width of the braking drum without danger of scratching the image part of the film. In principle, I produce all the effects of slipping, not as before, between the film and the drum, to which it adheres, but between the drum—or a friction element secured thereto— and a friction surface which is fixed or is subject to elastic control.

The device is made of such size, and the friction coefficients so chosen, that the adhesion between the film and it's said drum (or roller) will produce an actuating couple which always exceeds the resistance couple due to the friction of the drum itself, or of the parts attached thereto, upon the fixed or elastic friction surface.

In the constructional form shown by way of example in Fig. 12, 61 is a drum which may be covered at the periphery with a layer 62 of a substance having a large adhesion coefficient with reference to the film. The shaft 63 of said drum is mounted in the bearings 64 movable in guides 65 and supported by the springs 66; on the said shaft is mounted a wheel 67 whose periphery, under an effort F which overcomes the resistance of said springs, makes contact with a brake shoe 68 slidable in the supports 69 and controlled by a spring 70. The film is guided by the loose rollers 71.

If the tension T of the film when issuing from the apparatus (the direction of motion being Σ) is very small, the springs 66 will suffice to hold the device 61—63—67 in the raised position; no friction will occur between 67 and 68; the drum 61 can rotate freely, and the tensions T and $t$ are practically the same.

Should the tension T tend to increase, the effort F will increase. The said device 61—63—67 now overcomes the resistance of the springs 66 which may be properly adjusted for a more or less easy play. The drum 67 makes contact with the brake 68, thus at once causing a difference between the tensions T and $t$; this difference depends upon the said effort F, thus affording the desired result.

Figure 13:
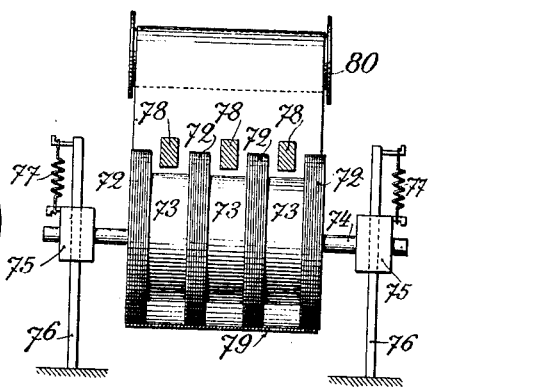
Fig. 13 is a vertical section of a modification of said device.

Fig. 13 shows a modification in which the guiding drum for braking purposes consists of a set of disks of a very adhesive substance 72, alternating with disks 73 which generally have a less adhesion and have a smaller diameter. The shaft 74 of said drum is mounted in the bearings 75 slidable in the guides 76; said bearings are controlled by springs 77 which are suitably adjustable, so that the least tension of the film will bring the parts 73 of the said drum into contact with the brake shoes 78 which are fixed or are held by spring strips. The film 79 will travel upon the lower part of the said drum and then upon the guide rollers 80 provided with cheeks, these being symmetrically disposed with reference to the plane of the figure. The said apparatus operates in the same manner as the preceding.

I may cause similar friction devices to act upon the film portion between the feeding reel and the gate, and will obviously obtain the desired result in all cases, i. e. a difference of tension between the input strand and the output strand of the film, this difference depending upon the value of the angle of winding of the film upon the drum, upon the coefficient of friction of the film on the said drum, and upon the constants of regulation of the apparatus, this being true for all increase of tension however small, and without requiring interference with the film-drawing mechanism or with the several parts of the cinematographic apparatus or appended devices.

The film will automatically regulate reduction of its tension, without employing any adjustment depending upon the movements of the apparatus.

The said device can be used in all cases in connection with a traveling flexible band, at any point of which it is desired to set up an opposition which prevents the transmission of all efforts of tension upon the said band from one side of the chosen point to the other.

The diagrammatic Figure, 14, shows a general arrangement comprising a certain number of the devices shown and specified above. The film proceeds from the unwinding feeding reel 41 upon the friction elements 38—39—40 (disposed as in Figure 9), and thence upon the feeding drum 42 and through the gate $c$, thence upon the drum 37 and upon a smooth drum 61, whose surface has a very high coefficiency of adhesion and which is secured to a friction wheel 67 coacting with a shoe 68 which is held in an elastic manner by the spring 70 in the guides 69, as in Figure 12, said drum is supported by a lever 65$^a$ and a spring 66$^a$, so that the wheel 67 will only make contact with the shoe 68 when the tension of the film has a certain value. The film then travels upon the smooth rollers 81—82 mounted on a lever 83 pivoting at 84 and controlled by the spring 85, and thence upon a stationary friction element 29 of cylindrical form against which it may be pressed by the friction member 28, which is actuated, against a spring, by the lever 27 whereof one end carries a roller 26 in contact with the film, as already shown in Figure 7. The film is then wound on its reel 35.

The winding reel 35 is driven at a variable speed obtained through the medium of a friction coupling interposed between the winding reel and a driving organ revolving at a uniform speed which is sufficiently large. The said coupling must be adjusted so that the tension of the film will never be sufficiently great to cause the deterioration or the breaking of the film.

This arrangement does not show the means for the periodic travel of the film in the gate, nor the optical parts of the cinematographic apparatus, nor the controls for the winding reel and the feeding reel, since all such parts are known per se, and are not comprised in the invention.

When the tension of the film between the reel 35 and the gate $c$ tends to increase, the lever 27 presses the film against the friction cylinder 29; at the same time the roller 81 is raised and the roller 82 lowered, for instance as shown in the dot-and-dash lines, so that the film is moved towards the drum 29 and is placed in contact therewith upon an arc $\beta\gamma'$ which is greater than the arc $\beta\gamma$ corresponding to a tension which is very small or null. This causes an increase or reduction of the tension T—$t$ between the parts of the film on the respective sides of the drum 29. This effect may not be absolutely instantaneous, but all transmission of an abrupt action of the tension as far as the part of the film coacting with the teeth of the feeding drum 37 will be prevented by the device 61—67—68 which operates as above disclosed.

Having thus described my apparatus, what I claim as new therein, and my own invention, is:—

1. In a cinematographic apparatus having a gate for the projection, the combination of winding and unwinding reels, feeding drums adapted to drive the film at a uniform speed, friction means upon which the film travels between the winding and unwinding reels and the respective feeding drums when the said drums exercise upon the film a tension strain, the said friction means being constituted by cylindrical surfaces the generating lines of which are parallel to the surface of the film, the said cylindrical surfaces having relatively to the film a relative speed in the direction of the projection gate.

2. In a cinematographic apparatus having a gate for the projection, the combination of winding and unwinding reels, feeding drums adapted to drive the film at a uniform speed, friction means upon which the film travels between the winding and unwinding reels and the respective feeding drums when the said drums exercise a tension stress upon the film, the said friction means being constituted by two lateral portions adapted to rub upon the perforated edges of the film, and the middle portion between the said lateral portions consisting in a ring the periphery of which is slightly recessed, the surface of friction of the said lateral portions having relatively to the film a relative speed in the direction of the projection gate.

3. In a cinematographic apparatus having a gate for the projection, the combination of winding and unwinding reels, feeding drums adapted to drive the film at a uniform speed, friction means upon which the film travels between the winding and unwinding reels and the respective feeding drums when the said drums exercise upon the film a tension stress, the said friction means being constituted by rotary cylindrical elements, and gear or toothed wheels connected to the said rotary elements and adapted to move the latter at a same tangential speed, the relative speed of the film relatively to the said friction means remaining constantly in the direction of the projection gate.

4. In a cinematographic apparatus having a projection gate, the combination of winding and unwinding reels, a feeding drum at the inlet of the said projection gate adapted to drive the film at a uniform speed, friction means upon which the film travels between the unwinding reel and the said feeding drum when the said drum exercises upon the film a tension stress, the said friction means being constituted by rotary cylindrical elements, and means whereby the said cylindrical elements having imparted thereto a tangential speed which is greater than the average speed of feeding of the film.

5. In a cinematographic apparatus having a projection gate, the combination of an unwinding reel, a feeding drum at the inlet of the said projection gate, adapted to drive the film at a uniform speed, friction means upon which the film travels between the said unwinding reel and the said feeding drum when the said drum exercises upon the film a tension stress, the said friction elements being constituted by three rotary cylindrical elements, the axes of the first two cylindrical elements being fixed and the axis of the third cylindrical element being movable concentrically to the second cylindrical element, gear or toothed wheels connected to the three cylindrical elements and adapted to cause the latter to rotate at a same tangential speed which is greater than the normal speed of the film and elastic means to return the third cylindrical element against the tension exercised by the film upon the said element.

6. In a cinematographic apparatus having a gate for the projection, the combination of winding and unwinding reels, means adapted for driving the film at a uniform speed, a feeding drum at the inlet of the projection gate, an output roller, a multiplicity of intermeshing pinions having pitch diameters of substantially the same diameters as the diameter of the rollers, a lever pivoted on the axis of one of the said rollers, and a yielding member.

7. In a cinematographic apparatus having a gate for the projection, the combination of winding and unwinding reels, means adapted for driving the film at a uniform speed, a feeding drum at the inlet of the projection gate, an output roller, a multiplicity of intermeshing pinions having pitch diameters of substantially the same diameters as the diameter of the rollers, a lever pivoted on the axis of one of the said rollers, and a yielding member, and a lever on which one of said pinions is carried, said lever being fulcrumed on the axis of said lever.

8. In a cinematographic apparatus having a gate for the projection, the combination of winding and unwinding reels, means adapted for driving the film at a uniform speed, a feeding drum at the inlet of the projection gate, an output roller, a multiplicity of intermeshing pinions having pitch diameters of substantially the same diameters as the diameters of the rollers, a lever pivoted on the axis of one of the said rollers, and a yielding member, and a lever on which one of said pinions is carried, said lever being fulcrumed on the axis of said lever and a spring connected to the free end of said lever.

ETIENNE OEHMICHEN.